US012737551B1

(12) United States Patent
Ardazi et al.

(10) Patent No.: US 12,737,551 B1

(45) Date of Patent: Sep. 15, 2026

(54) COMPUTER-AWARE CACHING FOR LOW LATENCY LLM SERVING

(71) Applicant: Intuit Inc., Mountain View, CA (US)

(72) Inventors: Shai Ardazi, Petah Tikva (IL); Matan Vetzler, Petah Tikva (IL); Ofir Ben Shoham, Petah Tikva (IL); Sagiv Antebi, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/365,091

(22) Filed: Oct. 21, 2025

(51) Int. Cl.
*G06F 40/30* (2020.01)
*G06F 16/215* (2019.01)
*G06F 16/334* (2025.01)

(52) U.S. Cl.
CPC ............ *G06F 40/30* (2020.01); *G06F 16/215* (2019.01); *G06F 16/3347* (2019.01)

(58) Field of Classification Search
CPC ..... G06F 40/30; G06F 16/215; G06F 16/3347
See application file for complete search history.

(56) References Cited

U.S. PATENT DOCUMENTS

2015/0186514 A1* 7/2015 Singh .................... G06F 16/951 707/706
2015/0278901 A1* 10/2015 Windemuth ........... G16B 20/20 705/26.5
2024/0231924 A1* 7/2024 Srikanthan ............ G06F 9/5027
2025/0156453 A1* 5/2025 Conway .................. G06F 40/30
2025/0200332 A1* 6/2025 Tabacof ............... G06Q 30/015
2025/0258818 A1* 8/2025 Raheja .............. G06F 16/24539
2025/0328566 A1* 10/2025 Iyengar ................. G06F 16/383
2025/0371307 A1* 12/2025 Pressland ............... G06N 3/042
2025/0384036 A1* 12/2025 Ganesan ........... G06F 16/24539

OTHER PUBLICATIONS

Regmi, S., et al., "GPT Semantic Cache: Reducing LLM Costs and Latency via Semantic Embedding Caching", Dec. 9, 2024, 9 pages.
Megiddo, N., et al., "ARC: A Self-Tuning, Low Overhead Replacement Cache", Mar. 31, 2003, 16 pages.

* cited by examiner

*Primary Examiner* — Pierre Louis Desir
*Assistant Examiner* — Keisha Y. Castillo-Torres
(74) *Attorney, Agent, or Firm* — Lathrop GPM LLP

(57) ABSTRACT

Computer-aware caching for low latency large language model (LLM) serving includes detecting an idle time of a hardware processor while monitoring the hardware processor, triggering, in response to detecting idle time, a LLM to generate a candidate set that includes a request and a response from a raw chat log, generating a candidate set embedding from the request, and storing the candidate set with the candidate set embedding in a data repository to generate a cached candidate set that includes a cached request and a cached response. The candidate set is retrieved using the candidate set embedding matching a user request embedding and verified based on a semantic equivalence between the cached request and a user request.

16 Claims, 7 Drawing Sheets

410

User: hey QuickBooks is acting up again... tried to do payroll and it just froze, no idea why.

LLM Assistant: Sorry to hear that! When you say it froze, did you see any error message or number on the screen? QuickBooks usually shows a code for payroll issues.

User: yeah, right, lemme check... okay it says "Payroll Update Error PS077."

LLM Assistant: Thanks for confirming. Error PS077 happens when QuickBooks can't install the payroll tax table update properly. This can occur if the QuickBooks Desktop program itself is out of date, if the update files are damaged, or if something interrupted the installation like a network drop.

User: okay but I didn't do anything different, it just started after some update last night.

LLM Assistant: That fits the pattern. To fix PS077, the first step is to update QuickBooks Desktop fully. At the top menu, click Help > Update QuickBooks Desktop, then choose Update Now. Once updates are installed, you should close QuickBooks and reopen it.

User: mmhm where's the payroll update part then? I never remember that.

LLM Assistant: Good question. After updating QuickBooks Desktop, you'll need to update the payroll tax table. Go to Employees > Get Payroll Updates, then select Download Entire Update. When it finishes, you'll see a confirmation that the tax table was installed.

User: okay, so first I do the software update, then I go to Employees menu, right?

LLM Assistant: Exactly. Update QuickBooks Desktop first, restart it, then go to the Employees menu to download the payroll updates. Doing both steps usually clears the PS077 error.

User: alright, sounds clear enough. I'll give that a try and see if payroll runs this time.

LLM Assistant: Great! If the error still appears after these steps, sometimes reinstalling QuickBooks with the repair option helps, but most people don't need to go that far. Let me know how it goes.

Q1: What causes QuickBooks payroll update error PS077?

A1: Error PS077 occurs when QuickBooks cannot install the payroll tax table update correctly. This may happen if QuickBooks Desktop is outdated, the update files are damaged, or the installation is interrupted, for example, by a network issue.

Q2: How do I fix QuickBooks payroll update error PS077?

A2: To fix PS077, first update QuickBooks Desktop by selecting Help > Update QuickBooks Desktop and installing the available updates. After restarting QuickBooks, go to Employees > Get Payroll Updates, choose Download Entire Update, and install the latest payroll tax table. This sequence of steps usually resolves the issue.

Q3: Where can I find the option to update QuickBooks Desktop?

A3: The update option is located in the top menu under Help > Update QuickBooks Desktop. After selecting this, you can run the update and restart QuickBooks to apply the changes.

Q4: How can I update the payroll tax table in QuickBooks?

A4: In QuickBooks Desktop, open the Employees menu and select Get Payroll Updates. From there, choose Download Entire Update. Once the download completes, QuickBooks will confirm that the payroll tax table has been installed.

==== Cache Questions ====

[C1] What causes QuickBooks payroll update error PS077?

[C2] How do I fix QuickBooks payroll update error PS077?

[C3] Where can I find the option to update QuickBooks Desktop?

[C4] How can I update the payroll tax table in QuickBooks?

Q1: I'm getting QuickBooks payroll error PS077, what steps do I need to take to resolve it?

1. C2|cos=0.8541|How do I fix QuickBooks payroll update errorPS077?
2. C1|cos=0.7915|What causes QuickBooks payroll update errorPS077?
3. C4|cos=0.7849|How can I update the payroll tax table inQuickBooks?

-> Decision: ACCEPT (pass to verifier SLM)

Q2: How do I recover a lost QuickBooks company file password?

1.C2| cos=0.8424|How do I fix QuickBooks payroll update errorPS077?
2.C4| cos=0.8135|How can I update the payroll tax table inQuickBooks?
3.C3| cos=0.8047|Where can I find the option to update QuickBooksDesktop?

-> Decision: ACCEPT (pass to verifier SLM)

Matching Query (should be found via semantic equivalence): Q1: "I'm getting QuickBooks payroll error PS077, what steps do I need to take to resolve it?"

SLM answer: The semantically equivalent qeustion is: "How do I fix QuickBooks payroll update error PS077?"

Non-Matching Query (new QuickBooks issue, not in cache): "How do I recover a lost QuickBooks company file password?" SLM answer: There is no semantically equivalent question.

*FIG. 4E*

COMPUTER-AWARE CACHING FOR LOW LATENCY LLM SERVING

BACKGROUND

Large language models (LLMs) have revolutionized natural language processing (NLP) by enabling machines to generate text that closely resembles human language based on predicting the next token in a sequence. An LLM's performance is the LLM's ability to produce accurate and coherent output. However, the performance comes at a cost in terms of processor usage to execute the LLM.

Because of the large size of the LLM, the execution of the LLM on each request results in significant computing resource usage. Moreover, in modern LLM services, the LLM may process hundreds of thousands, millions, or even billions of daily requests. Many of the requests are redundant. For example, various users may have the same problem or want the same output.

To address the challenge of the significant computing resource usage given the number of redundant request, some solutions use simple caching techniques. These simple caching techniques may be naïve because they are based on simple string equality or simple embedding techniques.

Such simple techniques do not account for the fact that redundant requests are often phrased differently or may be determined only after a number of noisy exchanges between the user and the LLM in the communication. Additionally, caching itself uses computing resources in both storage usage and processor usage. For example, if every request is stored in cache, then storage usage is increased. However, detecting and removing duplicates in the cache can result in increased processor usage. Thus, a continued problem exists in managing resource usage on a computing system handling a large volume of requests.

SUMMARY

In general, in one aspect, one or more embodiments are directed to a method. The method also includes detecting an idle time of a hardware processor while monitoring the hardware processor, triggering, in response to detecting idle time, a large language model (LLM) to generate a candidate set may include a request and a response from a raw chat log, generating a candidate set embedding from the request, and storing the candidate set with the candidate set embedding in a data repository to generate a cached candidate set. The cached candidate set includes a cached request and a cached response. The method also includes generating a user request embedding from a user request received in a user interface via a network connection from a user device, selecting, from the cached candidate sets in the data repository, the cached candidate set responsive to the cached candidate set having the candidate set embedding matching the user request embedding, and triggering a language model to verify a semantic equivalence between the cached candidate set and the user request. The method also includes outputting, via the network connection to the user device, the cached response responsive to the semantic equivalence being verified.

In general, in one aspect, one or more embodiments include are directed to a system. The system includes a hardware processor, an application executing on the hardware processor that includes a chat interface configured to receive a user requests and transmit a large language model (LLM) responses. The system also includes a data repository for storing raw chat logs, and cached candidate sets that include a candidate set with a candidate set embedding. The system also includes a machine learning system that includes a hardware processor utilization monitor for detecting an idle time of the hardware processor while monitoring the hardware processor, and triggering, in response to detecting idle time, an LLM to generate the candidate set may include a request and a response from a raw chat log of the plurality of raw chat logs. The machine learning system also includes an embedding model for generating a candidate set embedding from the request and generating a user request embedding from a user request received in a user interface via a network connection from a user device. The machine learning system also includes a selection system for selecting from the cached candidate sets in the data repository, the cached candidate set responsive to the cached candidate set having the candidate set embedding matching the user request embedding, triggering a language model to verify a semantic equivalence between the cached candidate set and the user request. The system also includes the application configured for outputting, via the network connection to the user device, the cached response responsive to the semantic equivalence being verified.

In general, in one aspect, one or more embodiments are directed to a method that includes detecting an idle time of a hardware processor while monitoring the hardware processor, triggering, in response to detecting idle time, a large language model (LLM) to generate a candidate set that includes a request and a response from a raw chat log, generating a candidate set embedding from the request, and storing the candidate set with the candidate set embedding in a data repository to generate a cached candidate set that includes a cached request and a cached response. The candidate set is retrieved using the candidate set embedding matching a user request embedding and verified based on a semantic equivalence between the cached request and a user request.

Other aspects of one or more embodiments will be apparent from the following description and the appended claims.

BRIEF DESCRIPTION OF DRAWINGS

FIG. 4A, FIG. 4B, FIG. 4C, FIG. 4D, and FIG. 4E show an example in accordance with one or more embodiments.

Like elements in the various figures are denoted by like reference numerals for consistency.

DETAILED DESCRIPTION

One or more embodiments are directed to managing computing resource usage using caching of large language model (LLM) requests. The present disclosure introduces a computer-aware caching mechanism designed to optimize hardware processor utilization and lower latency in LLM chat systems. Embodiments use idle hardware processor cycles to precompute and store request response pairs as cached candidates from which new users requests may be compared. Namely, during the hardware processor idle time, caching of requests is performed so as to not reduce latency of cached responses during the processor busy time. During inference, the system may have a two-stage lookup process. Initial filtering of candidates may be performed by comparing embeddings of the candidate sets with the user request. The initial filtering is followed by a semantic verification step using a lightweight language model. This verification ensures contextual alignment before returning the cached response, thereby maximizing cache hit rates for frequently performed requests while minimizing false positives through semantic validation.

Thus, one or more embodiments may harvest idle processor cycles (e.g., utilization and memory wise) to proactively pre-compute and store high-value prompt-response pairs and maintain a cache candidate set. Further, one or more embodiments may use a two-stage lookup at inference. The first stage may be an embedding filter, followed by a second stage of a mini-LLM "verifier" to confirm semantic equivalence before returning a cached response. As such, embodiments may maximize processor utilization, boosts effective cache hit-rates on bursty popular prompts, and avoids false hits via a context-aware verification step.

Figure 1:
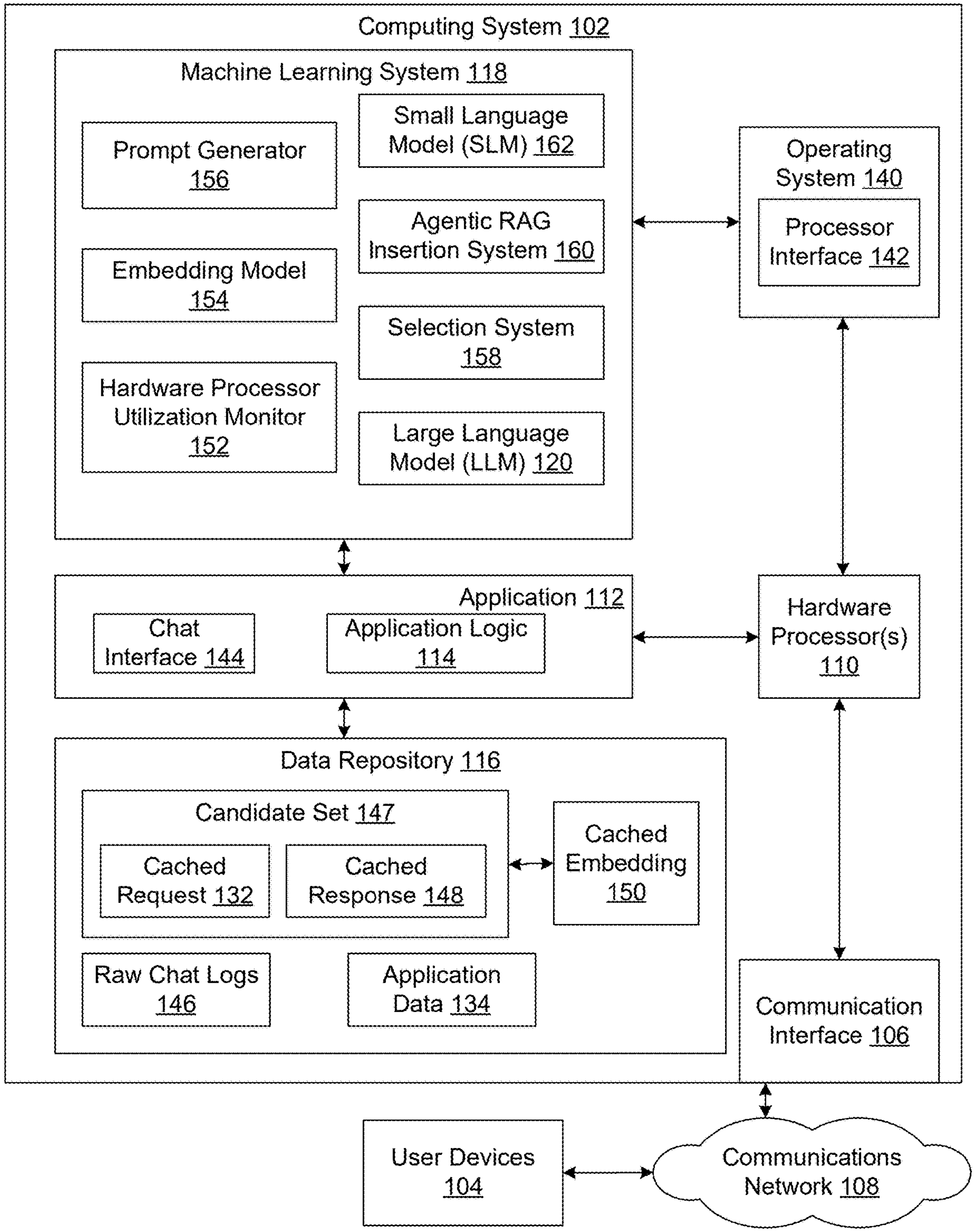
FIG. 1 shows a computing system, in accordance with one or more embodiments.

Turning to the Figures, FIG. 1 shows a computing system (102) configured to receive and respond to user requests with a large language model (LLM) while mitigating resource usage by the hardware processor through user requests and decreasing latency in responding to requests. The computing system (102) may correspond to the computing system shown in FIGS. 5A and 5B with one or more hardware processors (110). The hardware processors may each be one or more physical processors that are configured to execute the LLM. Although a singular form of hardware processor is used, a single hardware processor refers to any architecture or structure of a hardware processor. At least one of the hardware processors are monitored by the machine learning system (118), described below. The monitored hardware processor (110) is monitored by the operating system (140) through the processor interface (142). For example, the processor interface (142) may expose metrics detailing the number or percentage of compute cycles of the hardware processor (110) in use. An example of the processor interface (142) is a system call to the operating system requesting the graphics processing unit (GPU) utilization statistics.

The computing system (102) is configured to interface with a user device (104) via a communication interface (106) and a communications network (108). The communication interface (106) may include a hardware or software interface (e.g., network interface card, networking stack) that is configured to transmit information over the communications network (108). The communications network (108) may be the Internet, an internal network, or another network. A user device (104) is a device that may be used by a user. For example, a user device may be the computing system shown in FIG. 5A and FIG. 5B. The user device (104) is directly or indirectly connected to the computing system (102).

The computing system (102) may be controlled by a single entity or multiple entities. The computing system (102) includes an application (112), connected to a machine learning system (118), connected to a data repository (116).

The computing system (102) includes an application (112) that includes a chat interface (144) and application logic (114). The application (112) is a software application that is configured to interact directly or indirectly with a user. For example, the application may be a web application, a local application on the user device, or another application. The application (112) may be dedicated to being an intermediary between the user device (104), and the machine learning system (118), or may be a standalone application that uses the features of the machine learning system (118) to perform specific functionality for the user. The machine learning system (118) may be part of the application (112) as shown or may be separate from and used by multiple applications (112).

For example, the application (112) may be all or a portion of a program providing specific functionality, a web service, or another type of program. By way of an example, the application (112) may be a chat program or help program to provide a user with assistance in performing a task. As another example, the application (112) may be a dedicated application, such as a word processing application, spreadsheet application, presentation application, financial application, healthcare application, or any other software application, that may use the LLM (120) to respond to the user. The application (112) includes application logic (114) and a chat interface (144) connected to the machine learning system (118). The application logic (114) is a set of instructions of the application (112) that provides the functionality of the application (112). The chat interface (144) is an interface by which a user may submit requests to the machine learning system (118). For example, the chat interface (144) may be a graphical user interface (GUI) or GUI widget that is configured to receive requests and output responses of the machine learning system (118). The chat interface (144) is further configured to communicate with the machine learning system (118).

The data repository (116) stores various data artifacts, including application data (134), a candidate set (147) containing cached requests (132) and cached responses (148), raw chat logs (146), and application data (134), which are utilized to inform and refine system outputs.

The application data (134) includes user data, transmissions, metadata, models, outputs, sequences, user account information, context information, and other information about the application.

The raw chat logs (146) are logs of the user chats via the chat interface (144). Raw chat logs (146) may be noisy. For example, raw chat log (146) is log of a chat between the LLM (120) and a user that is not a single topic question and answer pair. Different reasons for the noisiness may exist. For example, the noise in the raw chat log (146) may be caused from having multiple requests and multiple responses, whereby several of the requests are clarifications of prior requests. In the example, a response may be for all of the requests after clarifications are made. Further, the raw chat log may have misstatements, grammatical and spelling errors, locale specific language, and other linguistic modifications that do not change semantic meaning. Additionally, the raw chat log (146) may have multiple topics over time.

The data repository (116) also includes functionality to store multiple candidate sets (147). As shown in FIG. 1, each a candidate set (147) includes a cached request (132) and a cached response (148). The cached request (132) may be a portion of the raw chat log (146) after processing. For example, the cached request (132) may be a summarization or an exemplary request that is generated to replicate a form of the requests in the raw chat log (146). Thus, the cached request (132) may not explicitly exist in the raw chat log even after spelling, grammar, and linguistic irregularities are addressed. Rather, the cached request (132) may be the detected and intended request of the original user in the raw chat log after clarifications are performed. The cached request may be a form of the final request or an aggregation of the requests in the raw chat log (146). For example, the cached request (132) may include components and clarification through multiple requests in the corresponding raw chat log. In one or more embodiments, the cached request (132) is a natural language request with proper grammar and spelling.

The cached response (148) is the response generated by the LLM in the raw chat log. For example, the cached response (148) may be the detected response that matches the detected intent of the user in the cached request. The cached response (148) is the response after clarifications. In some embodiments, the cached response (148) is the final response. In other embodiments, the cached response (148) is an intermediate response and is detected as responding to the intended request. In some cases, the cached response is a concatenation of multiple responses in the raw chat log (146). For example, the LLM may output a first response and then output a second response. The second response may be responsive to the user requesting both types of output or to a user requesting supporting documentation to the first response. In such a scenario, the first response and the second response may be concatenated together to form the cached response.

The candidate set (147) is connected to a cached embedding (150). The cached embedding is a vectorized embedding or other high-dimensional representation of the cached request (132). The cached embedding (150) encodes the semantic meaning of the cached request (132). The cached embedding (150) is an encoding of the user's intended request in the raw chat log. To store the cached embedding (150), the data repository (116) may have a vector data repository or be embedded in a multi-data repository architecture that enables proximity metrics and vector space computations.

Continuing with FIG. 1, the data repository (116) and the application (112) are connected to a machine learning system (118). The machine learning system (118) is a system that is configured to efficiently use and indirectly control the hardware processor (110). The machine learning system (118) includes a hardware processor utilization monitor (152), an embedding model (154), a prompt generator (156), an LLM (120), a selection system (158), an agentic retrieval augmented generation (RAG) insertion system (160), and a small language model (SLM) (162). Each of these components is described below.

The hardware processor utilization monitor (152) is configured to obtain current utilization statistics of the hardware processor (110) via the processor interface (142). The hardware processor utilization monitor (152) may have one or more thresholds for comparing against the utilization statistics. The thresholds may be static thresholds or dynamic thresholds.

The embedding model (154) is a machine learning model that is configured to generate a vector embedding of a cached request and a user request. Thus, the embedding model is a type of machine learning model that is configured to transform high-dimensional text into dense, low-dimensional vectors. Examples of the embedding model may be a Sentence Bidirectional Encoder Representation for Transformer (Sentence-BERT) model, universal sentence encoder (USE) model, OpenAI embeddings, or another model that is configured to encode a semantic meaning.

The prompt generator (156) is software that is configured to generate a prompt to the SLM (162) and the LLM (120). For example, the prompt generator (156) may be configured to perform operations on the prompt before adding the prompt to a prompt template to generate the prompt. The prompt generator (156) may be multiple software components or a single software component.

The LLM (120) complies with the standard definition used in the art. An LLM in machine learning refers to a model that significantly exceeds standard machine learning models in terms of scale, complexity, and capacity. Specifically, the LLM is defined by having millions or more parameters (e.g., can be in the hundreds of millions to billions of parameters), which cause the LLM to learn and represent highly complex patterns in data. An LLM therefore uses substantial computational resources for training and inference and are often trained on massive datasets. Specifically, the LLM (120) has millions or more parameters and is generally trained on large quantities of unlabeled text using self-supervised learning or semi-supervised learning. The LLM (120) can understand natural language and generate text and possibly other forms of content. Examples of LLMs include the GPT-5® model and Open AI O3 from OpenAI company, LLAMAR from Meta, and GEMINI® from Google.

The SLM (162) complies with the standard definition used in the art. An SLM in machine learning refers to a model specifically designed to encode the semantic meaning of entire sentences or short text segments into dense vector representations. Unlike traditional word-level models, SLMs capture contextual relationships across multiple words, enabling a nuanced understanding of sentence-level semantics. The SLM (162) may be based on and built upon transformer-based architectures. The SLM (162) has fewer parameters than the LLM and is able to detect whether a cached request is semantically equivalent to a user request. The SLM (162) may be generally trained on a large corpora of natural language using self-supervised learning techniques, such as contrastive learning or masked language modeling. Examples of SLMs include SENTENCE-BERT®, UNIVERSAL SENTENCE ENCODER® from Google, and COHERE EMBED® from Cohere.

The agentic RAG insertion system (160) is configured to insert candidate sets into the data repository (116). For example, the agentic RAG insertion system (160) may be configured to obtaining candidate sets from a raw chat log, obtaining respective embedding, and managing duplicate candidates.

The selection system (158) is configured to select candidate sets from the data repository using respective candidate embeddings. The selection system (158) is further configured to select from one of the candidate embeddings based on the output of the SLM (162).

While FIG. 1 shows a configuration of components, other configurations may be used without departing from the scope of one or more embodiments. For example, various components may be combined to create a single component. As another example, the functionality performed by a single component may be performed by two or more components.

Figure 2:
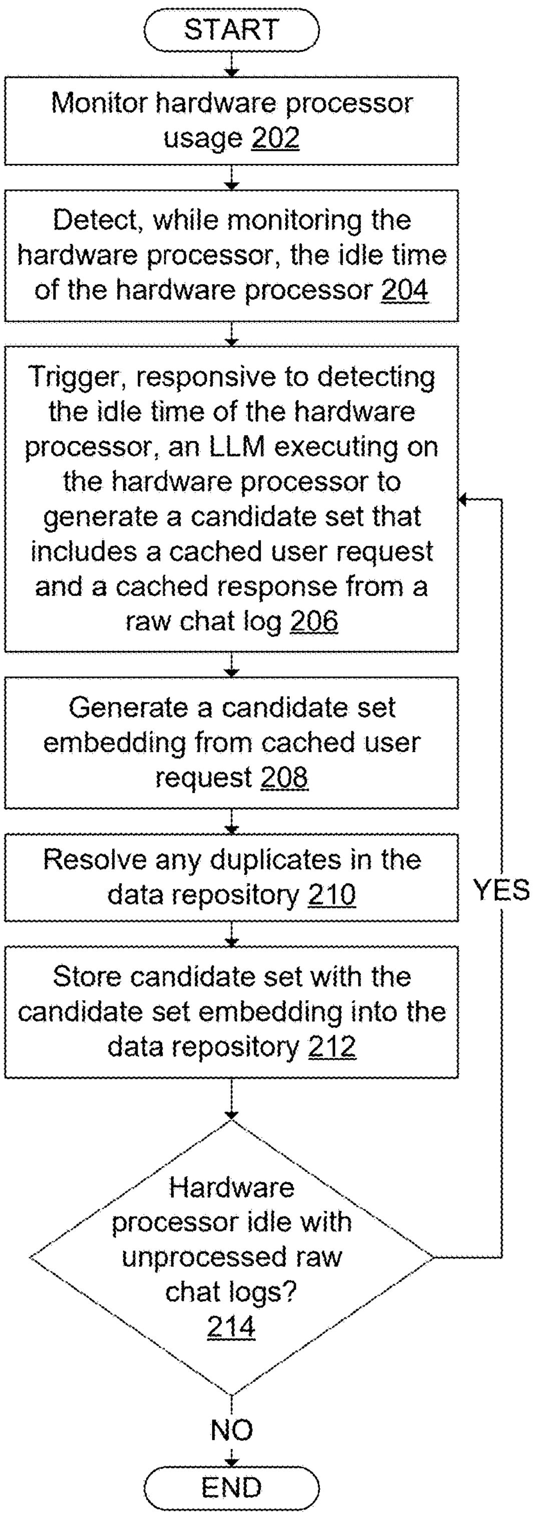
FIG. 2 shows a flowchart for performing processing during idle times in one or more embodiments.
Figure 3:
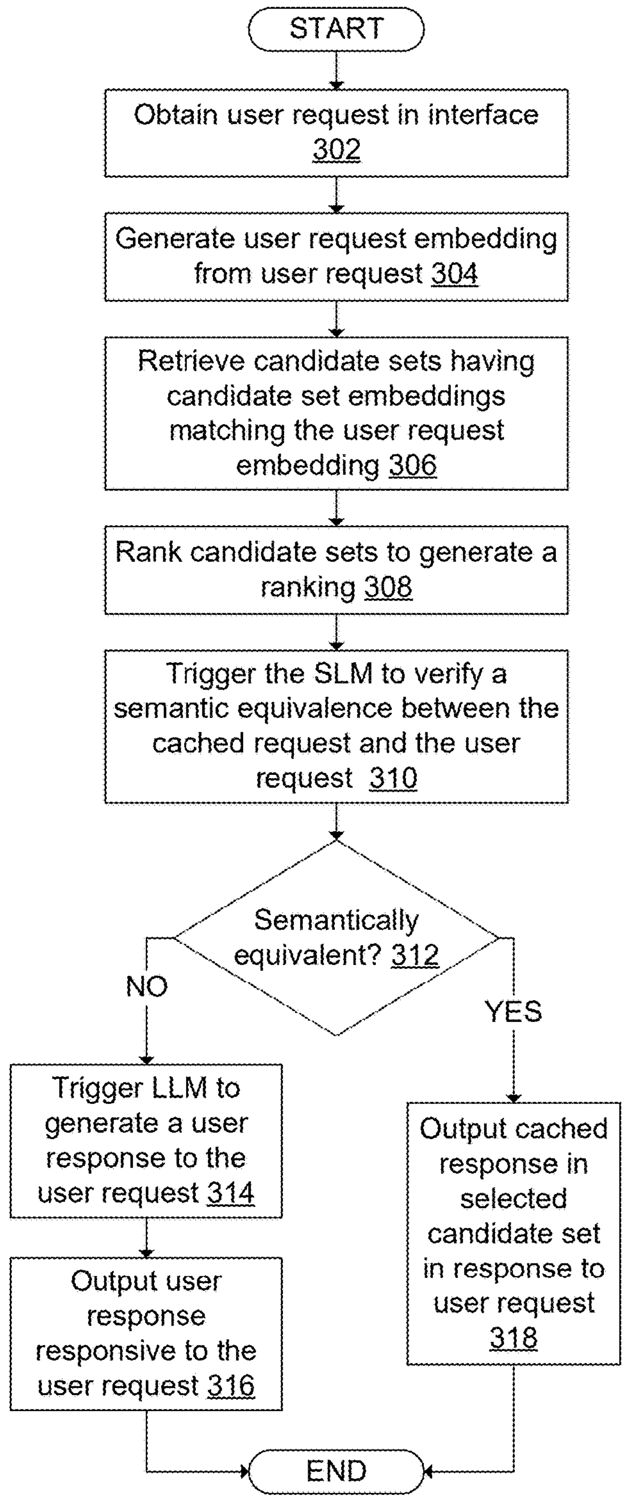
FIG. 3 shows a flowchart for responding to a user request in accordance with one or more embodiments.

FIG. 2 and FIG. 3 show a flowchart of a method, in accordance with one or more embodiments. FIG. 2 shows a flowchart for generating and storing candidate sets from raw data logs. FIG. 3 shows a flowchart for responding to a user request optionally using a candidate set in accordance with one or more embodiments. The method of FIG. 2 may be implemented using the system of FIG. 1 and one or more of the steps may be performed on or received at one or more computer processors. While the various steps in this flowchart are presented and described sequentially, at least some of the steps may be executed in different orders, may be combined or omitted, and at least some of the steps may be executed in parallel. Furthermore, the steps may be performed actively or passively.

Block 202 includes monitoring hardware processor usage. Monitoring hardware processor usage may include the hardware processor utilization monitor periodically transmitting a system call to the operating system to poll the operating system for usage statistics. The period may be after a couple of seconds, minutes, or at a certain timing intervals. As another example, the hardware processor utilization monitor may request the usage statistics at times in which the hardware processor is expected to be idle, based on previous utilization of the hardware processor. For example, the hardware processor utilization monitor may use historical statistics to determine when to poll the processor interface and determine the usage of the processor. At the operating system level, low-level hardware counters to measure CPU load, thread activity, and execution cycles may be used to obtain the usage statistics. The monitoring may be performed at regular intervals to assess whether the processor is actively executing tasks or is in a low-utilization state.

Block 204 includes detecting, while monitoring the hardware processor, the idle time of the hardware processor. One of the challenges of LLMs is the amount of hardware processor execution cycles that are used to process prompts with user requests. To address this challenge and reduce latency of requests to the LLM, the caching is performed when the hardware processor is idle rather than the hardware processor being busy.

Detecting idle time of the hardware processor may be performed by analyzing the usage statistics collected in Block 202 to identify time periods where the processor utilization is below a predefined threshold. For dynamic thresholds, detection algorithms may use heuristics or statistical models to determine when the processor is idle, such as when no active threads are scheduled or when CPU usage remains consistently low over a time window.

Block 206 includes triggering, responsive to detecting the idle time of the hardware processor, the LLM executing on the hardware processor to generate a candidate set that includes a cached user request and a cached response from a raw chat log. The hardware processor utilization monitor triggers the agentic RAG insertion system to initiate caching of candidate sets from the raw chat logs.

The agentic RAG insertion system may use the prompt generator to generate a prompt to the LLM with the raw chat log. The prompt requests that the LLM detect and generate a request from requests in the raw chat log, whereby the request detected may be a combination of multiple requests in the raw chat log. The LLM processes the raw chat log to determine the intended request of the user. Specifically, the LLM encodes the raw chat log and generates a feature embedding of the raw chat log based on the prompt that encodes the features corresponding to the requests in the raw chat log. The features are those that reflect the intent of the user. Decoding by the LLM causes features reflecting the intended request to be translated into a natural language request that reflects the intent of the user. To generate the response, the prompt requests that the LLM identifies one or more responses in the raw chat log that alone or concatenated together answer the natural language request. The prompt may further request that the LLM perform the concatenation. Thus, the output of the LLM in performing the processing is a request and response pair, whereby the request is a summary of raw requests in the raw chat log, and the response is explicitly found as a raw LLM response in the raw chat log.

Block 208 includes generating a candidate set embedding from a cached user request. The agentic RAG insertion system sends the request output by the LLM to the embedding model. The embedding model then processes the request to generate a candidate set embedding and responds with the candidate set embedding. Specifically, the embedding model converts textual input into dense vector representations that capture semantic meaning. These embeddings enable efficient similarity comparisons and downstream processing. The embedding model outputs the candidate set embedding to the agentic RAG system.

Block 210 includes resolving any duplicates in the data repository. The data repository may already have candidate sets that substantively match the candidate set embedding. To resolve duplicates, the cached embeddings are compared against the candidate embedding. Specifically, an embedding of an existing cached request in an existing candidate set within the data repository is compared with the candidate embedding of the request to detect that the request is the duplicate of the existing cached request. Responsive to detecting the duplicate, the request and the existing cached request are both scored. The scoring may be based on the recency and frequency of the respective requests. The recency is the amount of time since the corresponding request was issued. The frequency is the frequency of times in which the cached request is used. Metrics describing the recency and frequency are combined via a mathematical function that generates a score.

Another method for resolving duplicates is to send a request with the candidate set and the cached candidate set to the LLM and asking the LLM to select the candidate set or the cached candidate set based on factors, such as recency and frequency. The LLM then selects one of the candidate sets. For example, the LLM may select the cached candidate set.

The lowest scoring candidate set or the candidate set not selected is removed from the data repository or ignored.

Block 212 includes storing the candidate set with the candidate set embedding into the data repository. The candidate set is written to the data repository and linked to the candidate set embedding that is also stored as a cached embedding in the data repository. The cached embedding may be stored in a vector database or relational database with embedding support. The storage process may include indexing for fast retrieval, tagging with metadata, and ensuring consistency with existing entries.

Block 214 includes determining whether the processor is idle with unprocessed raw chat logs. Specifically, the processing of raw chat logs to generate cached candidate sets continues until the hardware processor is deemed no longer idle. Block 214 includes evaluating at least two conditions: whether the processor remains idle and whether there are remaining raw chat logs that have not yet been processed. If both conditions are true, the system loops back to Block 206 to continue processing. If either condition is false, the process terminates or transitions to a different operational state, such as inference time processing of FIG. 3.

Block 302 includes obtaining a user request in the chat interface. Obtaining the user request may be performed by receiving a user-generated input through a user interface, which may include a graphical user interface (GUI), voice interface, command-line interface (CLI), or application programming interface (API). The system may capture the request as a structured or unstructured text string, and may optionally perform preprocessing such as tokenization, normalization, or validation to ensure the input is suitable for downstream processing.

Block 304 includes generating a user request embedding from the user request. The user request is transmitted to the selection system that triggers the embedding model with the user request. The embedding model operates similar to Block 208 using the user request to generate the user request embedding. The resulting embedding serves as a compact representation of the user's intent.

Block 306 includes retrieving candidate sets having candidate set embeddings matching the user request embedding. The selection system may query the data repository to identify candidate sets whose embeddings exhibit high similarity to the user request embedding. Similarity may be computed using distance metrics such as cosine similarity, Euclidean distance, or dot product. The result is a set of one or more candidate sets that have corresponding candidate set embeddings within a threshold degree of similarity to the user request embedding.

Block 308 includes optionally ranking candidate sets to generate a ranking. A ranking algorithm is used to the retrieved candidate sets based on their relevance to the user request. The ranking may consider factors such as recency and frequency to which a corresponding candidate set is outputted. The ranking may further be based on the vector distance to the user request embedding.

Block 310 includes triggering the SLM to verify a semantic equivalence between the cached request in the candidate set and the user request. The processing in Block 310 may be performed in order of the ranking, whereby if semantic equivalence is not found, the SLM processes the cached request in the next candidate set according to the ranking to find semantic equivalence. In one or more embodiments, only the cached request is considered without considering the cached response. The SLM is a small language model that operates using fewer compute cycles of the hardware processor than the LLM. Further, the comparison is only a binary decision as to whether the cached embedding is semantically equivalent to the user request. Thus, the SLM is orders of magnitude less involved than the LLM. The SLM may output a binary or probabilistic equivalence score for the candidate set.

Block 312 includes a decision block to determine whether a cached request in a candidate set is semantically equivalent. If a candidate set is deemed not semantically equivalent to the user request, the method proceeds to Block 314 to generate a new response. If no equivalence is found, the method proceeds to Block 318 to retrieve a cached response.

Block 314 includes triggering an LLM to generate a user response to the user request. The user request is transmitted to the prompt generator to generate an LLM prompt from the user prompt. The LLM prompt may include security instructions to stop malicious attacks as well as a description of the form and structure of the output. The LLM prompt is transmitted to generate a new response tailored to the user request. The LLM may use the original request, contextual data, and optionally the top-ranked candidate set to produce a coherent and contextually appropriate output.

Block 316 includes outputting the user response responsive to the user request. Block 316 may be performed by transmitting the generated response from the LLM back to the user via the same interface used to obtain the request. The system may format the response for display, log the user request and user response in a raw chat log.

Returning to Block 312, if semantic equivalence is detected, Block 318 includes outputting a cached response from selected candidate sets in response to a user request. The cached response may be performed in a similar manner to outputting the user response.

Because of the number of redundant requests to an LLM that are generic across users, most of the processing is done through Blocks 302-318 thereby limiting the number of hardware cycles of the hardware processor. The hardware processor is thereby able to process more user requests, respond to user requests faster, or have lower latency in responding to user requests.

FIG. 4A, FIG. 4B, FIG. 4C, FIG. 4D, and FIG. 4E show an example in accordance with one or more embodiments. The following example is for explanatory purposes only and not intended to limit the scope of one or more embodiments.

As an overview, the utilization monitor continually measures GPU compute usage and triggers cache-builder when_util<X % for N seconds. The prompt candidate selector maintains rolling statistics on prompts over a 30 day window (e.g. 300 k calls). Each prompt is scored by recency rank (i.e., newer prompts score higher), and frequency rank (embedding-based counts for near-duplicates). The candidate selector selects top M=K %× monthly calls to cache. Background precomputation is performed during idle times. The background precomputation includes burning idle cycles to compute prompt and LLM output pairs and stores (prompt, embedding, response) in a vector database. Raw prompts (=chats) are passed through a layer that generates a few question-answer pairs based on the chats. This is done as raw prompts may be very noisy. An agentic RAG concept is utilized to update with just the missing information so that if there's already a very similar prompt, then it wouldn't be inserted.

During inference lookup, for incoming query, the embedding is computed and top-K nearest neighbors in the vector DB retrieved. The K candidates are passed to a small verifier LLM. If verifier deems any candidate semantically equivalent, return its cached response, else the main LLM is invoked.

Figure 4A:
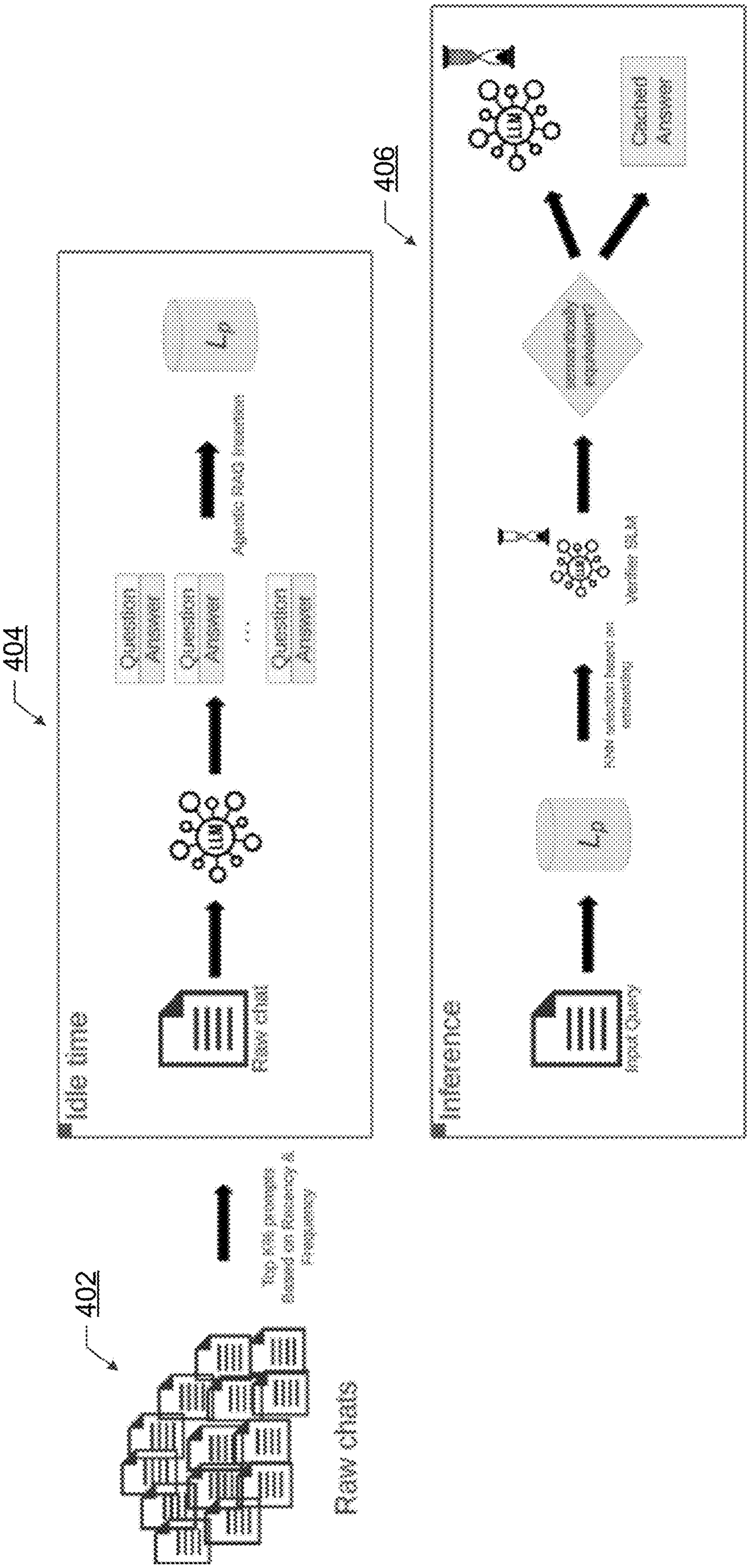

FIG. 4A shows an implementation of processing in accordance with one or more embodiments. Specifically, FIG. 4A shows a two-phase system architecture including an idle time phase (404) and an inference phase (406), designed to optimize response generation in the chat-based environment.

During the idle time phase (404), the system begins by collecting raw chat logs (402). The raw chat logs (402) are analyzed to identify the top K % of prompts (i.e., requests) based on criteria such as recency and frequency of occurrence. The selected prompts are then processed by an agentic Retrieval-Augmented Generation (RAG) insertion system. The RAG insertion system generates corresponding question-answer pairs as candidate sets. The generated pairs are stored in a structured database referred to as $L_p$, forming a repository of precomputed responses that can be leveraged during active inference.

In the inference phase (406), when a user submits a query, the system may perform a K-Nearest Neighbors (KNN) search of the $L_p$ database using embedding similarity to retrieve candidate responses. The candidate responses are then passed through an SLM verifier, which evaluates whether the retrieved content is semantically equivalent to the user request. If semantic equivalence is confirmed, the system outputs the cached answer directly from the $L_p$ repository. If not, the system proceeds with additional processing to generate a new response.

As shown, FIG. 4A describes the hybrid approach that utilizes idle system time for precomputing useful data and applies efficient semantic retrieval during active user interaction to enhance responsiveness and reduce computational overhead.

FIG. 4B shows an example of a raw chat log (410). The user is the end user in the raw chat log that is submitting requests. The LLM assistant is the output of the LLM. As shown in the raw chat log, the raw requests in the raw chat log have colloquialisms, idioms, and the user's intent spanning multiple requests. As such, the raw chat log is noisy.

FIG. 4C shows an example of question and answer pairs (412) that are stored as candidate sets from the raw chat logs, including the raw chat log (410) in FIG. 4B. The candidate sets of question-answer pairs have cached requests, designated by Q, and cached responses, designated by A.

FIG. 4D shows an example during the inference phase (420). The user submits two requests in the form of questions, Q1 and Q2. The cached requests are C1, C2, C3, and C4, which are from the candidate sets in FIG. 4C. For the first request, C2, C1, and C4 are deemed to have corresponding embeddings that are similar to the embedding of Q1. The cosign distance (COS) is determined for each cached request as shown in FIG. 4D. Because cached requests are found that are within a threshold degree of similarity, the flow proceeds with sending the cached requests to the verifier SLM. A similar processing is performed for Q2 as shown in FIG. 4D.

Continuing with FIG. 4E, FIG. 4E shows the result of processing of the cached requests and the corresponding user questions Q1 and Q2 by the SLM during the verification stage (430). Q1 matches the cached request, and thus, the cached response is outputted to the user. Q2 does not match and represents a new issue. Thus, Q2 is passed to the LLM to have the LLM generate an answer to output to the user. Overtime, the candidate sets cover more and more issues, thereby reducing the workload on the hardware processor. Accordingly, one or more embodiments increase efficiency of the hardware processor, reduce the number of executions of the LLM, and improve latency of the system.

One or more embodiments exhibit the following over prior systems. Embodiments use background tasks to build or refresh a prompt-response cache. Further, while most prompt caches rely on a single eviction metric (e.g. least-recently-used or least-frequently-used) or simply grow until storage is exhausted, leading to suboptimal hit-rates under bursty or long-tail workloads, embodiments may have a recency and frequency ranking with a strict cap (e.g., 3% of monthly traffic). Thus, candidates are ranked via a tunable weighted sum of recency and embedding-based frequency scores before selection. Further, embodiments perform both vector matching as well as semantic matching to confirm that a hit is truly semantically equivalent. Specifically, every lookup retrieves the top-K embedding neighbors and then runs a mini-LLM verifier to confirm true semantic equivalence before returning a cached response.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
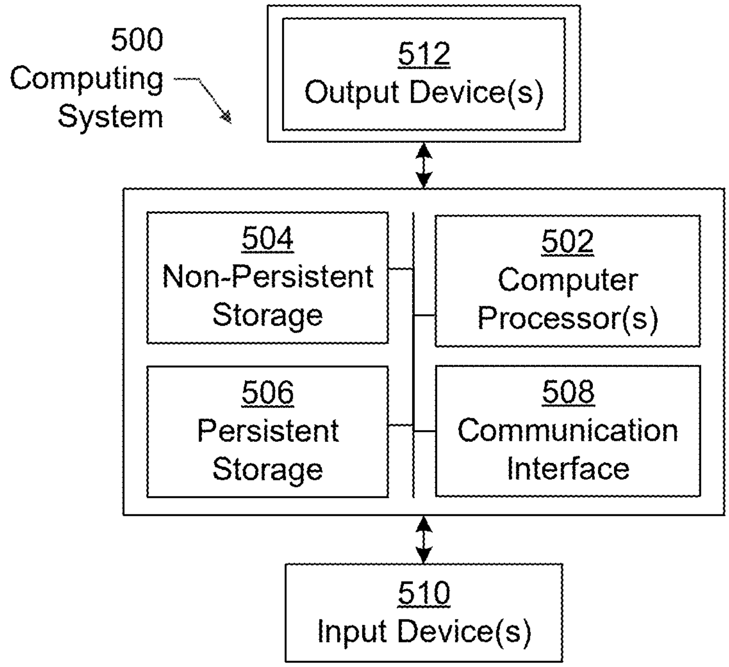
FIG. 5A and FIG. 5B shows a computing system in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
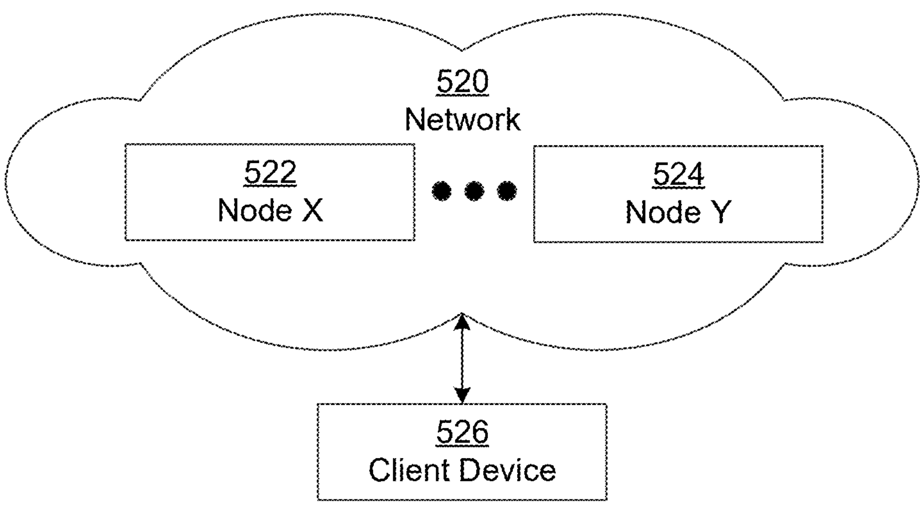

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting systems. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
- monitoring a hardware processor using a low-level hardware counter to measure execution cycles of the hardware processor and obtain a usage statistic;
- detecting, based on the usage statistic, an idle time of the hardware processor while monitoring the hardware processor;
- triggering, in response to detecting idle time, a large language model (LLM) to generate a candidate set comprising a request and a response from a raw chat log;
- generating, by an embedding model, a candidate set embedding from the request;
- storing the candidate set with the candidate set embedding in a data repository to generate a cached candidate set comprising a cached request and a cached response;
- generating, by the embedding model, a user request embedding from a user request received in a user interface via a network connection from a user device;
- retrieving a subset of a plurality of cached candidate sets in the data repository according to a plurality of vector distances of a respective plurality of candidate set embeddings of the subset of the plurality of cached candidate sets to the user request embedding;
- ranking the subset of the plurality of cached candidate sets in order of the plurality of vector distances to obtain a ranking;
- iteratively, in order of the ranking, until a semantic equivalence is found with a corresponding cached request in a corresponding candidate set in the subset of the plurality of cached candidate sets:
  - processing, by a language model, the user request and the corresponding cached request of the candidate set to determine whether the user request and the corresponding cached request are semantically equivalent, and
  - moving to a next cached request in the subset of the plurality of cached candidate sets when semantic equivalence is not found; and
- outputting, via the network connection to the user device, the cached response in the corresponding candidate set responsive to the semantic equivalence being found.

2. The method of claim 1, further comprising:
- resolving a duplicate in the data repository prior to storing the candidate set in the data repository.

3. The method of claim 2, wherein resolving the duplicate comprises:
- comparing an embedding of an existing cached request in an existing candidate set with the request to detect that the request is the duplicate of the existing cached request;
- scoring the request and the existing cached request to select the request; and
- removing the existing candidate set from the data repository based on the request being selected.

4. The method of claim 3, wherein the scoring is based on a recency and a frequency of the existing cached request.

5. The method of claim 1, wherein the cached request comprises a summary of a plurality of raw requests in the raw chat log.

6. The method of claim 5, wherein the cached response is a raw LLM response in the raw chat log.

7. The method of claim 1, further comprising:
generating a second user request embedding from a second user request;
selecting, from a plurality of candidate sets in the data repository, the candidate set responsive to the candidate set having the candidate set embedding matching the user request embedding;
triggering a language model to verify whether a second cached request in the candidate set is semantically equivalent to the second user request;
detecting, by the language model, that the second cached request is not semantically equivalent;
triggering the LLM to generate a new user response from the second user request; and
outputting the new user response responsive to the semantic equivalence being verified.

8. The method of claim 1, further comprising:
periodically monitoring usage of the hardware processor through a processor interface of an operating system to detect a busy time and the idle time of the hardware processor.

9. A system comprising:
a hardware processor;
an application executing on the hardware processor comprising a chat interface configured to receive a plurality of user requests and transmit a plurality of large language model (LLM) responses;
a data repository for:
storing a plurality of raw chat logs;
storing a plurality of cached candidate sets comprising a candidate set with a candidate set embedding to generate a cached candidate set comprising a cached request and a cached response;
a machine learning system comprising:
hardware processor utilization monitor for:
monitoring the hardware processor using a low-level hardware counter to measure execution cycles of the hardware processor and obtain a usage statistic,
detecting an idle time of the hardware processor while monitoring the hardware processor, and
triggering, in response to detecting idle time, an LLM to generate the candidate set comprising a request and a response from a raw chat log of the plurality of raw chat logs,
an embedding model for:
generating the candidate set embedding from the request, and
generating a user request embedding from a user request received in a user interface via a network connection from a user device,
a selection system for:
retrieving a subset of the plurality of cached candidate sets in the data repository according to a plurality of vector distances of a respective plurality of candidate set embeddings of the subset of the plurality of cached candidate sets to the user request embedding,
a ranking algorithm for:
ranking the subset of the plurality of cached candidate sets in order of the plurality of vector distances to obtain a ranking, and
a small language model for:
iteratively, in order of the ranking, until a semantic equivalence is found with a corresponding cached request in a corresponding candidate set in the subset of the plurality of cached candidate sets:
processing the user request and the corresponding cached request of the candidate set to determine whether the user request and the corresponding cached request are semantically equivalent, and
moving to a next cached request in the subset of the plurality of cached candidate sets when semantic equivalence is not found; and
the application configured for outputting, via the network connection to the user device, the cached response responsive to the semantic equivalence being found.

10. The system of claim 9, further comprising:
an agentic retrieval augmented generation insertion system configured for resolving a duplicate in the data repository prior to storing the candidate set in the data repository.

11. The system of claim 10, wherein resolving the duplicate comprises:
comparing an embedding of an existing cached request in an existing candidate set with the request to detect that the request is the duplicate of the existing cached request,
scoring the request and the existing cached request to select the request, and
removing the existing candidate set from the data repository based on the request being selected.

12. The system of claim 11, wherein the scoring is based on a recency and a frequency of the existing cached request.

13. The system of claim 9, wherein the cached request comprises a summary of a plurality of user requests in the raw chat log.

14. The system of claim 13, wherein the cached response is a raw LLM response in the raw chat log.

15. The system of claim 9, wherein the machine learning system is further for:
generating a second user request embedding from a second user request;
selecting, from a plurality of candidate sets in the data repository, the candidate set responsive to the candidate set having the candidate set embedding matching the user request embedding;
triggering a language model to verify whether a second cached request in the candidate set is semantically equivalent to the second user request;
detecting, by the language model, that the second cached request is not semantically equivalent;
triggering the LLM to generate a new user response from the second user request; and
outputting the new user response responsive to the semantic equivalence being verified.

16. The system of claim 9, wherein the hardware processor utilization monitor is further for:
periodically monitoring usage of the hardware processor through a processor interface of an operating system to detect a busy time and the idle time of the hardware processor.

* * * * *